US009405631B2

(12) United States Patent
Prahlad et al.

(10) Patent No.: US 9,405,631 B2
(45) Date of Patent: Aug. 2, 2016

(54) SYSTEM AND METHOD FOR PERFORMING AN IMAGE LEVEL SNAPSHOT AND FOR RESTORING PARTIAL VOLUME DATA

(71) Applicant: Commvault Systems, Inc., Tinton Falls, NJ (US)

(72) Inventors: Anand Prahlad, Bangalore (IN); David Ngo, Shrewsbury, NJ (US); Prakash Varadharajan, Manalapan, NJ (US); Rahul S. Pawar, Marlboro, NJ (US); Avinash Kumar, Sunnyvale, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 14/928,046

(22) Filed: Oct. 30, 2015

(65) Prior Publication Data
US 2016/0154703 A1 Jun. 2, 2016

Related U.S. Application Data (63) Continuation of application No. 14/511,055, filed on Oct. 9, 2014, now Pat. No. 9,208,160, which is a continuation of application No. 14/138,599, filed on Dec. 23, 2013, now Pat. No. 8,886,595, which is a
(Continued)

(51) Int. Cl.
*G06F 17/30* (2006.01)
*G06F 11/14* (2006.01)

(52) U.S. Cl.
CPC ...... *G06F 11/1446* (2013.01); *G06F 17/30088* (2013.01); *G06F 17/30312* (2013.01); *G06F 17/30917* (2013.01); *G06F 17/30598* (2013.01)

(58) Field of Classification Search
CPC .................. G06F 17/30088; G06F 17/30598
USPC .................................................. 707/639, 610
See application file for complete search history.

(56) References Cited

U.S. PATENT DOCUMENTS 4,296,465 A   10/1981 Lemak
4,686,620 A    8/1987 Ng
(Continued)

FOREIGN PATENT DOCUMENTS

AU   2006331932   12/2006
CA      2632935   12/2006
(Continued)

OTHER PUBLICATIONS

Armstead et al., "Implementation of a Campus-Wide Distributed Mass Storage Service: The Dream vs. Reality," IEEE, 1995, pp. 190-199.
(Continued)

*Primary Examiner* — Jean M Corrielus
(74) *Attorney, Agent, or Firm* — Knobbe, Martens, Olson & Bear, LLP (57) ABSTRACT

The present invention relates to a method for performing an image level copy of an information store. The present invention comprises performing a snapshot of an information store that indexes the contents of the information store, retrieving data associated with the contents of the information store from a file allocation table, copying the contents of the information store to a storage device based on the snapshot, and associating the retrieved data with the copied contents to provide file system information for the copied contents.

20 Claims, 6 Drawing Sheets

Related U.S. Application Data continuation of application No. 13/480,321, filed on May 24, 2012, now Pat. No. 8,645,320, which is a continuation of application No. 12/951,773, filed on Nov. 22, 2010, now Pat. No. 8,190,565, which is a continuation of application No. 12/433,238, filed on Apr. 30, 2009, now Pat. No. 7,840,533, which is a continuation of application No. 10/990,353, filed on Nov. 15, 2004, now Pat. No. 7,539,707.

(60) Provisional application No. 60/519,876, filed on Nov. 13, 2003, provisional application No. 60/519,576, filed on Nov. 13, 2003.

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitzky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,938,135 A | 8/1999 | Sasaki et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Stelner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,061,692 A | 5/2000 | Thomas et al. |
| 6,072,490 A | 6/2000 | Bates et al. |
| 6,076,148 A | 6/2000 | Kedem et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rikieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |

(56) References Cited

U.S. PATENT DOCUMENTS

| | | |
|---|---|---|
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Amangau |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,909 B1 | 4/2003 | Tamer et al. |
| 6,542,972 B2 | 4/2003 | Ignatius et al. |
| 6,557,089 B1 | 4/2003 | Reed et al. |
| 6,564,228 B1 | 5/2003 | O'Connor |
| 6,581,143 B2 | 6/2003 | Gagne et al. |
| 6,594,744 B1 | 7/2003 | Humlicek et al. |
| 6,604,118 B2 | 8/2003 | Kleinman et al. |
| 6,604,149 B1 | 8/2003 | Deo et al. |
| 6,615,223 B1 | 9/2003 | Shih et al. |
| 6,631,477 B1 | 10/2003 | LeCrone et al. |
| 6,631,493 B2 | 10/2003 | Ottesen et al. |
| 6,643,671 B2 | 11/2003 | Milillo et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,721,767 B2 | 4/2004 | De Meno et al. |
| 6,728,733 B2 | 4/2004 | Tokui |
| 6,728,736 B2 | 4/2004 | Hostetter et al. |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,518 B2 | 9/2004 | Armangau et al. |
| 6,799,258 B1 | 9/2004 | Linde |
| 6,836,779 B2 | 12/2004 | Poulin |
| 6,871,163 B2 | 3/2005 | Hiller et al. |
| 6,871,271 B2 | 3/2005 | Ohran et al. |
| 6,877,016 B1 | 4/2005 | Hart et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,898,688 B2 | 5/2005 | Martin et al. |
| 6,912,482 B2 | 6/2005 | Kaiser |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,948,038 B2 | 9/2005 | Berkowitz et al. |
| 6,948,089 B2 | 9/2005 | Fujibayashi |
| 6,952,705 B2 | 10/2005 | Knoblock et al. |
| 6,952,758 B2 | 10/2005 | Chron et al. |
| 6,954,834 B2 | 10/2005 | Slater et al. |
| 6,957,362 B2 | 10/2005 | Armangau |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,032,131 B2 | 4/2006 | Lubbers et al. |
| 7,035,880 B1 | 4/2006 | Crescenti et al. |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,072,915 B2 * | 7/2006 | Kaczmarski ........ G06F 11/1466 |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,096,315 B2 | 8/2006 | Takeda et al. |
| 7,100,089 B1 | 8/2006 | Phelps |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,111,026 B2 | 9/2006 | Sato |
| 7,120,757 B2 | 10/2006 | Tsuge |
| 7,130,860 B2 | 10/2006 | Pachet |
| 7,130,970 B2 | 10/2006 | Devassy et al. |
| 7,139,887 B2 | 11/2006 | Colgrove et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,165,079 B1 | 1/2007 | Chen et al. |
| 7,174,352 B2 | 2/2007 | Kleinman et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,197,665 B2 | 3/2007 | Goldstein et al. |
| 7,203,807 B2 | 4/2007 | Urabe et al. |
| 7,209,972 B1 | 4/2007 | Ignatius et al. |
| 7,225,204 B2 * | 5/2007 | Manley ............... G06F 11/2066 707/639 |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,243,115 B2 * | 7/2007 | Manley ............... G06F 11/2066 |
| 7,246,140 B2 | 7/2007 | Therrien et al. |
| 7,246,207 B2 | 7/2007 | Kottomtharayil et al. |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Armangau et al. |
| 7,275,277 B2 | 10/2007 | Moskovich et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,370,232 B2 | 5/2008 | Safford |
| 7,373,364 B1 * | 5/2008 | Chapman ............ G06F 11/1451 |
| 7,380,072 B2 | 5/2008 | Kottomtharayil et al. |
| 7,383,538 B2 | 6/2008 | Bates et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,409,509 B2 | 8/2008 | Devassy et al. |
| 7,412,583 B2 | 8/2008 | Burton et al. |
| 7,415,488 B1 | 8/2008 | Muth et al. |

(56) References Cited

U.S. PATENT DOCUMENTS

| | | |
|---|---|---|
| 7,421,554 B2 | 9/2008 | Colgrove et al. |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,467,167 B2 | 12/2008 | Patterson |
| 7,467,267 B1 | 12/2008 | Mayock |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyll et al. |
| 7,523,276 B1 * | 4/2009 | Shankar ............ G06F 11/1451 707/999.202 |
| 7,523,483 B2 | 4/2009 | Dogan |
| 7,529,748 B2 | 5/2009 | Wen et al. |
| 7,529,782 B2 | 5/2009 | Prahlad et al. |
| 7,532,340 B2 | 5/2009 | Koppich et al. |
| 7,536,291 B1 | 5/2009 | Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,565,572 B2 | 7/2009 | Yamasaki |
| 7,567,991 B2 | 7/2009 | Armangau et al. |
| 7,568,080 B2 | 7/2009 | Prahlad et al. |
| 7,581,077 B2 | 8/2009 | Ignatius et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,606,868 B1 | 10/2009 | Le et al. |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,620,666 B1 | 11/2009 | Root et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,664,771 B2 | 2/2010 | Kusters et al. |
| 7,668,798 B2 | 2/2010 | Scanlon et al. |
| 7,669,029 B1 | 2/2010 | Mishra et al. |
| 7,685,126 B2 | 3/2010 | Patel et al. |
| 7,689,467 B1 | 3/2010 | Belanger et al. |
| 7,702,533 B2 | 4/2010 | Barnard et al. |
| 7,716,171 B2 | 5/2010 | Kryger |
| 7,734,578 B2 | 6/2010 | Prahlad et al. |
| 7,734,715 B2 | 6/2010 | Hyakutake et al. |
| 7,739,235 B2 | 6/2010 | Rousseau et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,844,577 B2 | 11/2010 | Becker et al. |
| 7,870,355 B2 | 1/2011 | Erofeev |
| 7,930,274 B2 | 4/2011 | Hwang et al. |
| 7,930,476 B1 | 4/2011 | Castelli et al. |
| 7,962,455 B2 | 6/2011 | Erofeev |
| 7,962,709 B2 | 6/2011 | Agrawal |
| 8,024,294 B2 | 9/2011 | Kottomtharayil |
| 8,046,334 B2 | 10/2011 | Hwang et al. |
| 8,121,983 B2 | 2/2012 | Prahlad et al. |
| 8,166,263 B2 | 4/2012 | Prahlad |
| 8,190,565 B2 | 5/2012 | Prahlad et al. |
| 8,204,859 B2 | 6/2012 | Ngo |
| 8,219,524 B2 | 7/2012 | Gokhale |
| 8,271,830 B2 | 9/2012 | Erofeev |
| 8,352,422 B2 | 1/2013 | Prahlad et al. |
| 8,463,751 B2 | 6/2013 | Kottomtharayil |
| 8,489,656 B2 | 7/2013 | Erofeev |
| 8,510,271 B1 | 8/2013 | Tsaur et al. |
| 8,645,320 B2 | 2/2014 | Prahlad et al. |
| 8,725,694 B2 | 5/2014 | Kottomtharayil |
| 8,789,208 B1 | 7/2014 | Sundaram et al. |
| 8,868,494 B2 | 10/2014 | Agrawal |
| 8,886,595 B2 | 11/2014 | Prahlad et al. |
| 9,002,785 B2 | 4/2015 | Prahlad et al. |
| 9,208,160 B2 | 12/2015 | Prahlad et al. |
| 2001/0027457 A1 | 10/2001 | Yee |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0042222 A1 | 11/2001 | Kedem et al. |
| 2001/0044807 A1 | 11/2001 | Kleiman et al. |
| 2001/0044834 A1 | 11/2001 | Bradshaw et al. |
| 2002/0002557 A1 | 1/2002 | Straube et al. |
| 2002/0004883 A1 | 1/2002 | Nguyen et al. |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0069324 A1 | 6/2002 | Gerasimov et al. |
| 2002/0073070 A1 | 6/2002 | Morita et al. |
| 2002/0083055 A1 | 6/2002 | Pachet et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0133511 A1 | 9/2002 | Hostetter et al. |
| 2002/0133512 A1 | 9/2002 | Milillo et al. |
| 2002/0152381 A1 | 10/2002 | Kuriya et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2003/0018657 A1 | 1/2003 | Monday |
| 2003/0028736 A1 | 2/2003 | Berkowitz et al. |
| 2003/0061491 A1 | 3/2003 | Jaskiewicz et al. |
| 2003/0097296 A1 | 5/2003 | Putt |
| 2003/0131278 A1 | 7/2003 | Fujibayashi |
| 2003/0135783 A1 | 7/2003 | Martin et al. |
| 2003/0158834 A1 | 8/2003 | Sawdon et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0182301 A1 * | 9/2003 | Patterson ............ G06F 11/1458 |
| 2003/0187847 A1 | 10/2003 | Lubbers et al. |
| 2003/0225800 A1 | 12/2003 | Kavuri |
| 2004/0015468 A1 | 1/2004 | Beier et al. |
| 2004/0039679 A1 | 2/2004 | Norton et al. |
| 2004/0098425 A1 | 5/2004 | Wiss et al. |
| 2004/0107199 A1 | 6/2004 | Dalrymple et al. |
| 2004/0117572 A1 | 6/2004 | Welsh et al. |
| 2004/0139128 A1 | 7/2004 | Becker et al. |
| 2004/0143642 A1 | 7/2004 | Beckmann et al. |
| 2004/0148376 A1 | 7/2004 | Rangan et al. |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267835 A1 | 12/2004 | Zwilling et al. |
| 2004/0267836 A1 | 12/2004 | Armangau et al. |
| 2005/0027892 A1 | 2/2005 | McCabe et al. |
| 2005/0033800 A1 | 2/2005 | Kavuri et al. |
| 2005/0033878 A1 | 2/2005 | Pangal et al. |
| 2005/0080928 A1 | 4/2005 | Beverly et al. |
| 2005/0108292 A1 | 5/2005 | Burton et al. |
| 2005/0138306 A1 | 6/2005 | Panchbudhe et al. |
| 2005/0144202 A1 | 6/2005 | Chen |
| 2005/0187982 A1 | 8/2005 | Sato |

(56) References Cited

U.S. PATENT DOCUMENTS

| | | |
|---|---|---|
| 2005/0187992 A1 | 8/2005 | Prahlad et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0246376 A1 | 11/2005 | Lu et al. |
| 2005/0246510 A1 | 11/2005 | Retnamma et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0020616 A1 | 1/2006 | Hardy et al. |
| 2006/0034454 A1 | 2/2006 | Damgaard et al. |
| 2006/0047805 A1 | 3/2006 | Byrd et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0242371 A1 | 10/2006 | Shono et al. |
| 2006/0242489 A1 | 10/2006 | Brockway et al. |
| 2007/0006018 A1 | 1/2007 | Thompson et al. |
| 2007/0043956 A1 | 2/2007 | El Far et al. |
| 2007/0067263 A1 | 3/2007 | Husain et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0143371 A1 | 6/2007 | Kottomtharayil |
| 2007/0143756 A1 | 6/2007 | Gokhale |
| 2007/0174569 A1 | 7/2007 | Schnapp et al. |
| 2007/0179990 A1 | 8/2007 | Zimran et al. |
| 2007/0183224 A1 | 8/2007 | Erofeev |
| 2007/0185937 A1 | 8/2007 | Prahlad et al. |
| 2007/0185938 A1 | 8/2007 | Prahlad et al. |
| 2007/0185940 A1 | 8/2007 | Prahlad et al. |
| 2007/0186068 A1 | 8/2007 | Agrawal |
| 2007/0198602 A1 | 8/2007 | Ngo et al. |
| 2007/0226438 A1 | 9/2007 | Erofeev |
| 2007/0244571 A1 | 10/2007 | Wilson et al. |
| 2007/0283111 A1 | 12/2007 | Berkowitz et al. |
| 2007/0288536 A1 | 12/2007 | Sen et al. |
| 2007/0288711 A1 | 12/2007 | Chen et al. |
| 2008/0016293 A1 | 1/2008 | Saika |
| 2008/0028009 A1 | 1/2008 | Ngo |
| 2008/0059515 A1 | 3/2008 | Fulton |
| 2008/0103916 A1 | 5/2008 | Camarador et al. |
| 2008/0183775 A1 | 7/2008 | Prahlad et al. |
| 2008/0209146 A1 | 8/2008 | Imazu et al. |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0244205 A1 | 10/2008 | Amano et al. |
| 2008/0306954 A1 | 12/2008 | Hornqvist |
| 2009/0044046 A1 | 2/2009 | Yamasaki |
| 2009/0070330 A1 | 3/2009 | Hwang et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0319534 A1 | 12/2009 | Gokhale |
| 2009/0319582 A1 | 12/2009 | Simek et al. |
| 2009/0319585 A1 | 12/2009 | Gokhale |
| 2010/0005259 A1 | 1/2010 | Prahlad |
| 2010/0036931 A1 | 2/2010 | Certain et al. |
| 2010/0049753 A1 | 2/2010 | Prahlad et al. |
| 2010/0094808 A1 | 4/2010 | Erofeev |
| 2010/0100529 A1 | 4/2010 | Erofeev |
| 2010/0122053 A1 | 5/2010 | Prahlad et al. |
| 2010/0131461 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2011/0047340 A1 | 2/2011 | Olson et al. |
| 2011/0066599 A1 | 3/2011 | Prahlad et al. |
| 2011/0161300 A1 | 6/2011 | Hwang et al. |
| 2011/0196957 A1 | 8/2011 | Ayachitula et al. |
| 2011/0246416 A1 | 10/2011 | Prahlad et al. |
| 2011/0246429 A1 | 10/2011 | Prahlad et al. |
| 2011/0276594 A1 | 11/2011 | Chong et al. |
| 2011/0295804 A1 | 12/2011 | Erofeev |
| 2011/0295806 A1 | 12/2011 | Erofeev |
| 2012/0084523 A1 | 4/2012 | Littlefield et al. |
| 2012/0131684 A1 | 5/2012 | Lynch |
| 2012/0317074 A1 | 12/2012 | Ngo |
| 2013/0006926 A1 | 1/2013 | Erofeev |
| 2013/0006938 A1 | 1/2013 | Prahlad et al. |
| 2013/0007183 A1 | 1/2013 | Sorenson et al. |
| 2013/0238562 A1 | 9/2013 | Kumarasamy et al. |
| 2013/0262800 A1 | 10/2013 | Goodman et al. |
| 2013/0282662 A1 | 10/2013 | Kumarasamy et al. |
| 2014/0108351 A1 | 4/2014 | Nallathambi et al. |
| 2014/0201150 A1 | 7/2014 | Kumarasamy et al. |
| 2014/0281317 A1 | 9/2014 | Garman et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212897 A1 | 7/2015 | Kottomtharayil et al. |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 2000-347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |

OTHER PUBLICATIONS

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

(56) References Cited

OTHER PUBLICATIONS

Gray (#1 of 2, pp. 646-655), Jim; Reuter, Andreas, Transaction Processing: Concepts and Techniques, Morgan Kaufmann Publisher, USA 1994, 1994, pp. 646-655.
Gray (#2 of 2, pp. 604-609), Jim; Reuter Andreas, Transaction Processing Concepts and Techniques, Morgan Kaufmann Publisher, USA 1994, pp. 604-609.
Harrington, Lisa H., "The RFP Process: How to Hire a Third Party", Transportation & Distribution, Sep. 1988, vol. 39, Issue 9, in 5 pages.
http://en.wikipedia.org/wiki/Naive_Bayes_classifier, printed on Jun. 1, 2010, in 7 pages.
Jander, "Launching Storage-Area Net," Data Communications, US, McGraw Hill, NY, vol. 27, No. 4(Mar. 21, 1998), pp. 64-72.
Kashyap, et al., "Professional Services Automation: A knowledge Management approach using LSI and Domain specific Ontologies", FLAIRS-01 Proceedings, 2001, pp. 300-302.
Lyon J., Design considerations in replicated database systems for disaster protection, COMPCON 1988, Feb. 29, 1988, pp. 428-430.
Microsoft Corporation, "Microsoft Exchange Server: Best Practices for Exchange Database Management," 1998.
Microsoft, "How Volume Shadow Copy Service Works", Mar. 28, 2003.
Oltean, "VSS writers and inconsistent shadow copies", Sep. 1, 2005, http://blogs.msdn.com/b/adioltean/archive/2005/08/31/458907.aspx.
Rosenblum et al., "The Design and Implementation of a Log-Structure File System," Operating Systems Review SIGOPS, vol. 25, No. 5, New York, US, pp. 1-15 (May 1991).
The Oracle8 Replication Manual, Part No. A58245-01; Chapters 1-2; Dec. 1, 1997; obtained from website: http://download-west.oracle.com/docs/cd/A64702_01/doc/server.805/a58245/toc,htm on May 20, 2009.
Veritas Software Corporation, "Veritas Volume Manager 3.2, Administrator's Guide," Aug. 2001, 360 pages.
Wiesmann M, Database replication techniques: a three parameter classification, Oct. 16, 2000, pp. 206-215.
Examiner's Report for Australian Application No. 2003279847, Dated Dec. 9, 2008, 4 pages.
European Examination Report; Application No. 06848901.2 Apr. 1, 2009, pp. 7.
Examiner's First Report; Application No. 2006331932 May 11, 2011 in 2 pages.
Canadian Office Action dated Dec. 10, 2009, Application No. CA2544063.
Canadian Office Action dated Dec. 29, 2010, Application No. CA2546304.
First Office Action in Indian Application No. 3359/DELNP/2006 dated Feb. 11, 2013.
Final Office Action for Japanese Application No. 2003531581, Mail Date Mar. 24, 2009, 6 pages.
First Office Action for Japanese Application No. 2003531581, Mail Date Jul. 8, 2008, 8 pages.
International Preliminary Report on Patentability, PCT Application No. PCT/US2009/066880, mailed Jun. 23, 2011, in 9 pages.
International Search Report and Written Opinion dated Jan. 11, 2006, PCT/US2004/038455.
International Search Report and Written Opinion dated Mar. 25, 2010, PCT/US2009/066880.
International Search Report and Written Opinion dated Nov. 13, 2009, PCT/US2007/081681.
International Search Report and Written Opinion issued in PCT Application No. PCT/US2011/030396, mailed Jul. 18, 2011, in 20 pages.
International Search Report and Written Opinion issued in PCT Application No. PCT/US2011/38436, mailed Sep. 21, 2011, in 18 pages.
International Search Report dated Dec. 28, 2009, PCT/US2004/038324.
International Search Report from International Application No. PCT/US2006/048273, dated May 15, 2007.
Second Examination Report in EU Appl. No. 06 848 901.2-2201 dated Dec. 3, 2010.

\* cited by examiner

SYSTEM AND METHOD FOR PERFORMING AN IMAGE LEVEL SNAPSHOT AND FOR RESTORING PARTIAL VOLUME DATA

RELATED APPLICATIONS

Any and all applications for which a foreign or domestic priority claim is identified in the Application Data Sheet, or any correction thereto, are hereby incorporated by reference into this application under 37 CFR 1.57.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

RELATED APPLICATIONS

This application is related to the following patents, each of which is hereby incorporated herein by reference in its entirety:

U.S. Pat. No. 6,418,478, entitled "PIPELINED HIGH SPEED DATA TRANSFER MECHANISM," issued Jul. 9, 2002;

application Ser. No. 09/610,738, entitled "MODULAR BACKUP AND RETRIEVAL SYSTEM USED IN CONJUNCTION WITH A STORAGE AREA NETWORK," filed Jul. 6, 2000, now U.S. Pat. No. 7,035,880, issued Apr. 25, 2006;

application Ser. No. 09/744,268, entitled "LOGICAL VIEW AND ACCESS TO PHYSICAL STORAGE IN MODULAR DATA AND STORAGE MANAGEMENT SYSTEM," filed Jan. 30, 2001, now U.S. Pat. No. 6,542,972, issued Apr. 1, 2003;

Application Ser. No. 60/409,183, entitled "DYNAMIC STORAGE DEVICE POOLING IN A COMPUTER SYSTEM," filed Sep. 9, 2002;

application Ser. No. 10/681,386 entitled "SYSTEM AND METHOD FOR MANAGING STORED DATA," filed Oct. 7, 2003, now U.S. Pat. No. 7,568,080, issued Jul. 28, 2009; and Application Ser. No. 60/460,234, entitled "SYSTEM AND METHOD FOR PERFORMING STORAGE OPERATIONS IN A COMPUTER NETWORK," filed Apr. 3, 2003.

BACKGROUND OF THE INVENTION

The invention disclosed herein relates generally to a system and method for performing a snapshot and for restoring data. More particularly, the present invention relates to a system and method for performing snapshots of an information store, which are stored across multiple storage devices, and for restoring partial or full snapshots.

To obtain a more thorough understanding of the present invention, the following discussion provides additional understanding regarding the manner is which magnetic media is used to store information. Using traditional techniques, copies of an information store are performed using the operating system's file system. Copying is done by accessing the operating system's (OS) file system for the information store to be backed-up, such as the Windows NTFS file system. The file allocation system of the operating system typically uses a file allocation table to keep track of the physical or logical clusters across which each file in the information store is stored. Also called an allocation unit, a cluster is a given number of disk sectors that are treated as a unit, each disk sector storing a number of bytes of data. This unit, the cluster, is the smallest unit of storage the operating system can manage. For example, on a computer running Microsoft's Windows 95 operating system, the OS uses the Windows F AT32 32-bit file allocation table having a cluster size to 4K. The number of sectors is determined when the disk is formatted by a formatting program, generally, but not necessarily, when the OS is installed.

The operating system allocates disk space for a file only when needed. That is, the data space is not preallocated but allocated dynamically. The space is allocated one cluster at a time, where a cluster is a given number of consecutive disk sectors. The clusters for a file are chained together, and kept track of, by entries in a file allocation table (FAT).

The clusters are arranged on the disk to minimize the disk head movement. For example, all of the space on a track is allocated before moving on to the next track. This is accomplished by using the sequential sectors on the lowest-numbered cylinder of the lowest numbered platter, then all sectors in the cylinder on the next platter, and so on, until all sectors on all platters of the cylinder are used. This is performed sequentially across the entire disk, for example, the next sector to be used will be sector 1 on platter 0 of the next cylinder.

For a hard (fixed) disk, FAT, sector, cluster, etc. size is determined when a disk formatting program formats the disk, and are based on the size of the partition. To locate all of the data that is associated with a particular file stored on a hard disk, the starting cluster of the file is obtained from the directory entry, then the FAT is referenced to locate the next cluster associated with the file. Essentially, the FAT is a linked list of pointers to clusters on the disk, e.g., each 16-bit FAT entry for a file points to the next sequential cluster used for that file. The last entry for a file in the FAT has a number indicating that no more clusters follow. This number can be from FFF8 to FFFF (base 16) inclusive.

Figure 1:
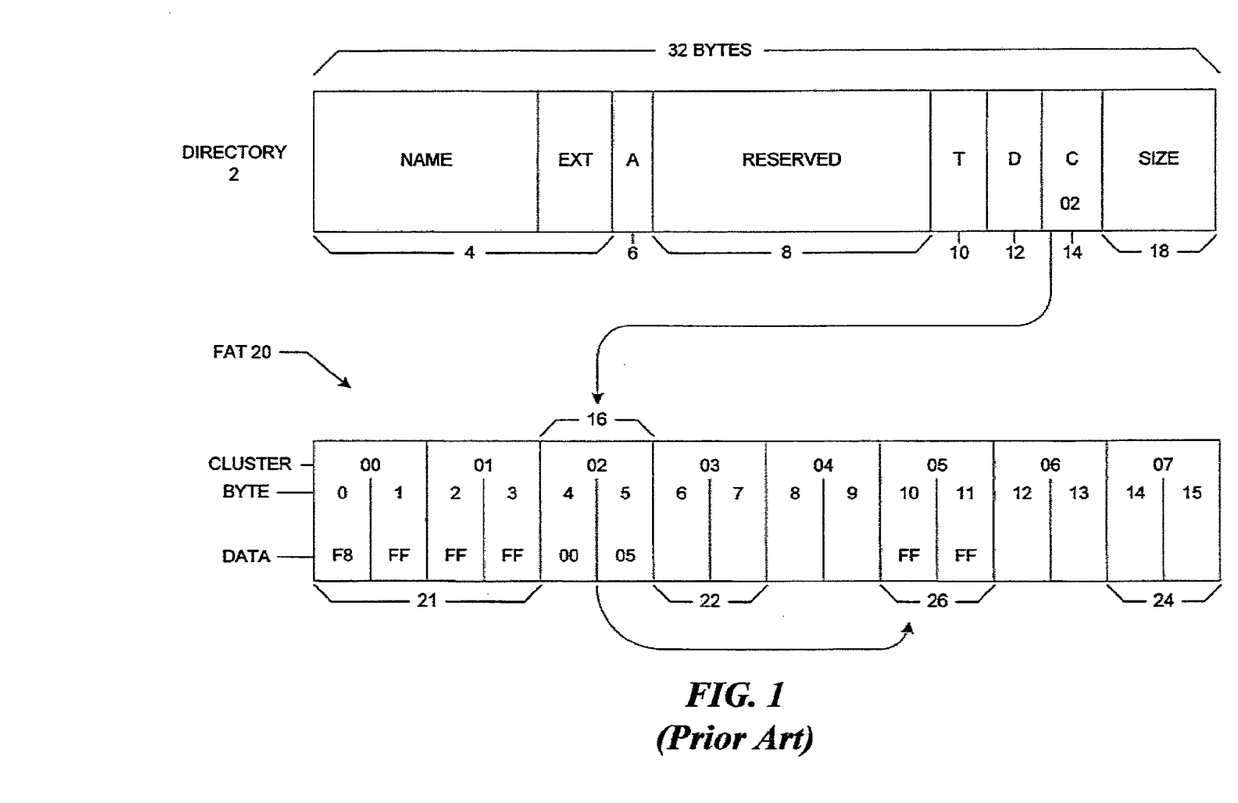
FIG. 1 is an example directory entry for a file in a prior art FAT of a Windows-formatted hard disk.

FIG. 1 shows an example directory entry 2 of a Windows-formatted hard disk and accompanying FAT 20. The exemplary directory entry 2 consists of 32 bytes of data. The name of the file and its extension are stored in the first eleven bytes 4 of the directory entry 2 and a file attribute byte 6 is provided. By definition, ten bytes 8 are reserved for future use and four bytes are provided to store time 10 and date 12 information (two bytes each). Two cluster bytes 14 point to the first cluster of sectors used to store the file information. The last four bytes 18 of the directory entry 2 are used to store the size of the file.

A sixteen-byte section of a FAT 20 is depicted. The first four bytes 21 store system information. A two-byte pair, bytes four and five (16), are the beginning bytes of the FAT 20 used to track file information. The first cluster for data space on all disks is cluster "02." Therefore, bytes four and five (16) are associated with the first cluster of disk sectors "02" used to store file information. Bytes six and seven (22) are associated with cluster "03" and bytes fourteen and fifteen (24) are associated with cluster "07."

This example illustrates how sectors associated with a file referenced in a directory are located. The cluster information bytes 14 in the directory 2 point to cluster number "02." The sectors in cluster "02" (not shown), contain the initial sector of data for the referenced file. Next, the FAT is referenced to see if additional clusters are used to store the file information. FAT bytes four and five (16) were pointed to by the cluster information bytes 14, and the information stored in bytes four and five (16) in the FAT 20 point to the next cluster used for the file. Here, the next cluster is "05". Accordingly, cluster "05" contains the next sector of data for the referenced file. FAT bytes ten and eleven (26) contain an end-of-file flag, "FFFF," indicating there are no more clusters associated with the referenced file. All of the information comprising the referenced file, therefore, is contained in clusters "02" and "05" on the disk.

As with other applications running on the computer, a typical backup application provides a read request to the operating system, which handles interpretation of the information contained in the FAT and reading of each file for the backup application. A file system is provided on the storage device that is used by the backup application to write files that are copied to the device. Similarly, the recovery portion of the backup application, or a separate recovery application, may read files from the storage device for recovery of the information.

Inherent problems and disadvantages have been discovered with currently available systems and methods for archiving data contained in an information store. One technique is to perform a full copy of the data contained in the information store. Utilizing this technique results in two separate copies of the information store, and the length of time it takes to make this kind of copy is related to the amount of data copied and the speed of the disk subsystem. For example, assuming a transfer rate of 25 MB/sec, the approach will take one hour to copy 90 GB of data. These techniques, however, in addition to other disadvantages, require the applications on the information store to be quiesced during the copy routine. This places a significant burden on system administrators to complete copying and get critical systems back into the production environment as, absent a high-speed data bus, the copying may consume a significant amount of time to complete.

Administrators typically keep multiple copies of a given information store. Unfortunately, this has the drawback of requiring n times the amount of space of the information store to maintain n copies, which can be quite expensive to store, in addition to requiring complex and time consuming techniques for restoration of the copied data.

One currently available alternative is to perform snapshots of an information store. With current snapshot systems and methods, administrators create an incremental copy that is an exact point-in-time replica of the source volume each time a snapshot is taken. A series of snapshot are stored locally on the information store from which it was taken and track incremental changes to the data in the information store. Furthermore, changed data is written to a new location in the information store as tracked by the snapshot. With knowledge regarding the change, as well as the changed data, the snapshot can be used to "roll back" changes to an information store to the point in time when the snapshot was taken. If there should be any logical corruption in the information store's data that went undetected for a period of time, however, these incremental updates faithfully replicate that logical corruption to the data when copying. Additionally, other drawbacks are associated with currently know snapshot techniques, including the significant drawback of preventing restoration from the snapshot in the event that the information store fails, as both the snapshot and the information store become unavailable.

Systems and methods are needed, therefore, that overcome problems associated with currently known techniques for taking, maintaining and restoring snapshots.

SUMMARY OF THE INVENTION

The present invention addresses, among other things, the problems discussed above with copying up data using systems and methods known to those of skill in the art. The invention provides systems and methods for performing n snapshots of an information store, without requiring n times the space of the information store, and storing those snapshots in multiple destinations across a network.

One embodiment of the system of the present invention creates the snapshots by taking a snapshot that indexes only clusters for files that were created or changed since the last snapshot. A snapshots, tn, is restored by restoring the clusters from the snapshot tn. The clusters that were not restored from snapshot $t_n$ are restored from snapshot $t_n-$}, etc., until the remaining clusters are restored from the first snapshot, snapshot $t_0$.

In accordance with some aspects of the present invention, multiple snapshots are kept on a storage device, without requiring n times the space of the total volume of the information store. The system creates snapshots at various points in time that index only clusters for files that were created or changed since the last snapshot, and creates a copy of the data that has been changed or created. This allows users to keep several snapshots without requiring n times the space of the total volume of the information store.

In some embodiments, the system stores a map, which may be part of a snapshot, to track specific files and folders with their corresponding copied clusters. The map created by reading data from the file allocation table of the information store and associates files and folders with the clusters stored in the snapshots. In this way, even though the snapshot was performed at the cluster level, individual or groups of files and/or folders may be restored without unnecessarily restoring the entire information store.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

Figure 2:
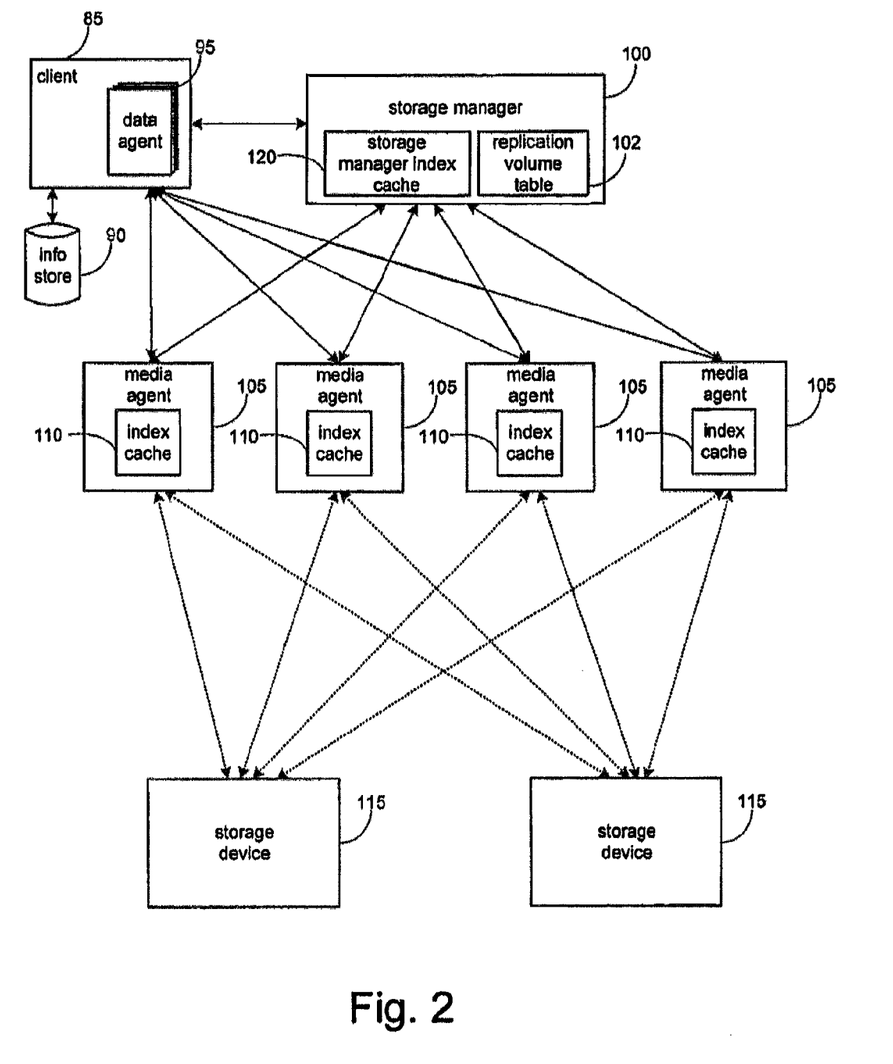
FIG. 2 is a block diagram illustrating a network architecture for performing snapshot operations according to one embodiment of the present invention.

With reference to FIGS. 2 through 6, embodiments of the present invention are shown. FIG. 2 presents a block diagram illustrating the components of a system for performing storage and restoration operations on electronic data in a computer network according to one embodiment of the invention. It should be understood that the invention is not limited to networked environments, and may also be implemented on a stand-alone computer or electronic device.

As shown, the system of FIG. 2 includes a storage manager 100, including a volume replication table 102 and a storage manager index cache 120, and one or more of the following: a client 85, an information store 90, a data agent 95, a media agent 105, a media agent index cache 110, and a storage device 115. One exemplary embodiment of the present system is the CommVault QuNetix three-tier system available from CommVault Systems, Inc. of Oceanport, N.J., further described in U.S. patent application Ser. No. 09/610,738 and hereby incorporated by reference in its entirety.

A data agent 95 is a software module that is generally responsible for retrieving data from an information store 90 for copies, snapshots, archiving, migration, and recovery of data stored in an information store 90 or other memory location, e.g., hard disc drive. Each client computer 85 preferably has at least one data agent 95 and the system can support many client computers 85. The data agent 95 provides an interface to an information store 90 to execute copies, snapshots, archiving, migration, recovery and other storage operations on data in conjunction with one or more media agents 105. According to one embodiment, each client 85 runs a number of data agents 95, wherein each data agent is configured to interface with data generated by or from a specific application, e.g., a first data agent to interface with Microsoft Exchange data and a second data agent to interlace with Oracle database data. As is explained in greater detail herein, a data agent 95 is III communication with one or more media agents 105 to effect the distributed storage of snapshots on one or more storage devices 115 that are remote from the information store that is the source of the snapshot 90.

The storage manager 100 is a software module or application that coordinates and controls other components comprising the system, e.g., data and media agents, 95 and 105, respectively. The storage manager 100 communicates with data 95 and media 105 agents to control and manage snapshot creation, migration, recovery and other storage operations. According to one embodiment, the storage manger 100 maintains data in a storage manager index cache 120 that instructs a given data agent 95 to work in conjunction with a specific media agent 105 to store snapshots on one or more storage devices 115.

The storage manager 100 maintains a storage manager index cache 120. Data in the storage manager index cache 120, which the storage manager 100 collects from data agents 95, media agents 105, user and other applications, is used to indicate, track and associate: logical relationships and associations between components of the system, user preferences, management tasks, and other data that is useful to the system. For example, the storage manager index cache 120 may contain data that tracks logical associations between media agents 105 and storage devices 115. The storage manager index cache 120 may also contain data that tracks the status of storage operations to be performed, storage patterns such as media use, storage space growth, network bandwidth, service level agreement ("SLA") compliance levels, data protection levels, storage policy information, storage criteria associated with user preferences, data retention criteria, storage operation preferences, and other storage-related information.

A media agent 105 is a software module that transfers data in conjunction with one or more data agents 95, as directed by the storage manager 100, between an information store 90 and one or more storage devices 115, such as a tape library, a magnetic media storage device, an optical media storage device, or other storage device. The media agent 105 communicates with and controls the one or more storage devices 115. According to one embodiment, the media agent 105 may communicate with the storage device 115 via a local bus, such as a SCSI adaptors. Alternatively, the storage device 115 may communicate with the data agent 105 via a Storage Area Network ("SAN"). Other types of communication techniques, protocols and media are contemplated as falling within the scope of the invention.

The media agent 105 receives snapshots, preferably with the changed data that is tracked by the snapshot, from one or more data agents 95 and determines one or more storage devices 115 to which it should write the snapshot. According to one embodiment, the media agent 1 05 applies load-balancing algorithms to select a storage device 115 to which it writes the snapshot. Alternatively, the storage manager 100 instructs the media agent 1 05 as to which storage device 115 the snapshot should be written. In this manner, snapshots from a given information store 90 may be written to one or more storage devices 115, ensuring data is available for restoration purposes in the event that the information store fails. Either the media agent or the storage manager 1 00 records the storage device on which the snapshot is written in a replication volume table 102, thereby allowing the snapshot to be located when required for restoring the information store 90.

A media agent 105 maintains a media agent index cache 110 that stores index data the system generates during snapshot, migration, and restore operations. For example, storage operations for Microsoft Exchange data generate application specific index data regarding the substantive Exchange data. Similarly, other applications may be capable of generating application specific data during a copy or snapshot. This data is generally described as metadata, and may be stored in the media agent index cache 110. The media agent index cache 110 may track data that includes, for example, information regarding the location of stored data on a given volume. The media agent index cache 110 may also track data that includes, but is not limited to, file names, sizes, creation dates, formats, application types, and other file-related information, information regarding one or more clients associated stored data, information regarding one or more storage policies, storage criteria, storage preferences, compression information, retention related information, encryption related information, and stream related information. Index data provides the system with an efficient mechanism for locating user files during storage operations such as copying, performing snapshots and recovery.

This index data is preferably stored with the snapshot that is backed up to the storage device 115, although it is not required, and the media agent 105 that controls the storage operation may also write an additional copy of the index data to its media agent index cache 110. The data in the media agent index cache 110 is thus readily available to the system for use in storage operations and other activities without having to be first retrieved from the storage device 115.

In order to track the location of snapshots, the system uses a database table or similar data structure, referred to herein as a replication volume table 102. The replication volume table 102, among other advantages, facilitates the tracking of multiple snapshots across multiple storage devices 115. For example, the system might, as directed by a policy or a user, store a first snapshot to on first storage device A, such as a tape drive or library, and then store subsequent snapshots containing only the changed cluster(s), tn, on a second storage device B, such as an optical drive or library. Alternatively, instructions may be stored within system components, e.g., a storage manger 100 or media agent 105, directing the storage devices 115 used to store snapshots. Information regarding the storage device 115 to which the snapshot is written, as well as other information regarding the snapshot generally, is written to the replication volume table 102. An exemplary structure according to one embodiment is as follows:

```
{
    id                  serial,    //  PRIMARY KEY FOR THIS
                                       TABLE
    PointInTime         integer,   //
    CreationTime        integer,   //  Timestamp of RV creation
    ModifyTime          integer,   //  Timestamp of last RV update
    Current State       integer,   //  Current state of R V
    CurrentRole         integer,   //  Current role of RV
    PrimaryVolumeId     integer,   //  FOREIGN KEY FOR
    PhysicalVolumeID    integer,   //  SNR Volume TABLE
    ReplicationPolicyId integer,   //  FOREIGN KEY FOR
    RVScratch           integer,   //  SNR Volume TABLE
    Flags               integer,   //  FOREIGN KEY FOR
    JobId               longlong       Replication Policy TABLE
    Snap VolumeId       integer,   //  FOREIGN KEY FOR
}
```

In the exemplary replication volume table, id is a unique identification number assigned by the system to the snapshot; PointInTime represents the date and time that the snapshot was created; CreationTime represents the date and time that the snapshot was completed; ModifyTime is the recorded date and time of the snapshot taken prior to the current snapshot; Current state is an identifier used to indicate a current status of the snapshot (e.g. pending, completed, unfinished, etc.); PrimaryVolumeId is the identifier for the information store 90 from which the snapshot is being made; PhysicalVolumeId is a hardware identifier for the information store 90; RVScratchVolumeId is an identifier for a scratch volume, which in some embodiments may be used to buffer additional memory as known to those of skill in the art; Flags contains a 32 bit word for various settings such as whether a snapshot has been taken previously, etc.; JobId stores the identifier for the job as assigned by a storage management module; and the Snap VolumeId points to the physical destination storage device 115 to which the snapshot is written.

As each snapshot indexes an information store at a given point in time, a mechanism must be provided that allows the snapshots taken of an information store to be chronologically related so that they are properly used for restoring an information store 90. According to the replication volume table 102, the CurrentRole integer may store a value for the relative position of a given snapshot in hierarchy of snapshots taken from a given information store 90 (e.g. first (to), second (tl), t2, t3, etc.)

In some embodiments, components of the system may reside on and be executed by a single computer. According to this embodiment, a data agent 95, media agent 105 and storage manager 100 are located at the client computer 85 to coordinate and direct local copying, archiving, migration, and retrieval application functions among one or more storage devices 115 that are remote or distinct from the information store 90. This embodiment is further described in U.S. patent application Ser. No. 09/610,738.

Figure 3:
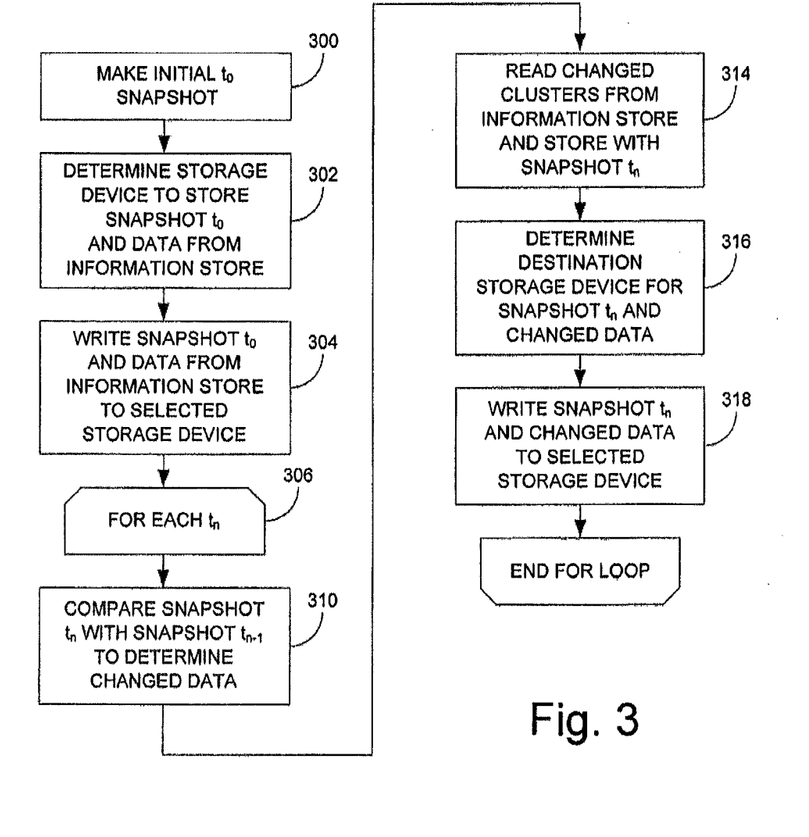
FIG. 3 is a flow diagram illustrating a method for creating a snapshot according to one embodiment of the present invention.

One embodiment of a method for using the system of the present invention to perform snapshots is illustrated in the flow diagram of FIG. 3. When the system is initialized, or at other times as directed by a user or rules, e.g., policies or other instructions, the storage manager directs the data agent to perform an initial full snapshot of the data stored in the information store, e.g., indexing the location of all data in the information store, in conjunction with one or more media agents. The system copies all of the data on the information store with the initial snapshot to a storage device, step 300.

Advantageously, the snapshot and data copied from the information store may be written to a storage device that is remote or different from the information store, step 302, e.g., local data from a given information store is written to a storage device attached to a network. The selection of a destination storage device for the snapshot may be accomplished using one or more techniques known to those of skill in the art. For example, a fixed mapping may be provided indicating a storage device for which all snapshots and copied or changed data should be written. Alternatively, an algorithm may be implemented to dynamically select a storage device from among a number of storage devices available on a network. For example, a storage manager may select a media agent to handle the transfer of the snapshot and copied data to a specific storage device based on criteria such as available bandwidth, other scheduled storage operations, media availability, storage policies, storage preferences, or other consider considerations. The snapshot, preferably along with the data from the information store, is written to the selected destination storage device, step 304. According to certain embodiments, the snapshot contains information regarding the files and folders that are tracked by the snapshot. Alternatively, the information regarding the files and folders that are indexed by the snapshot, e.g., file system information, are stored on the storage device.

Figure 4:
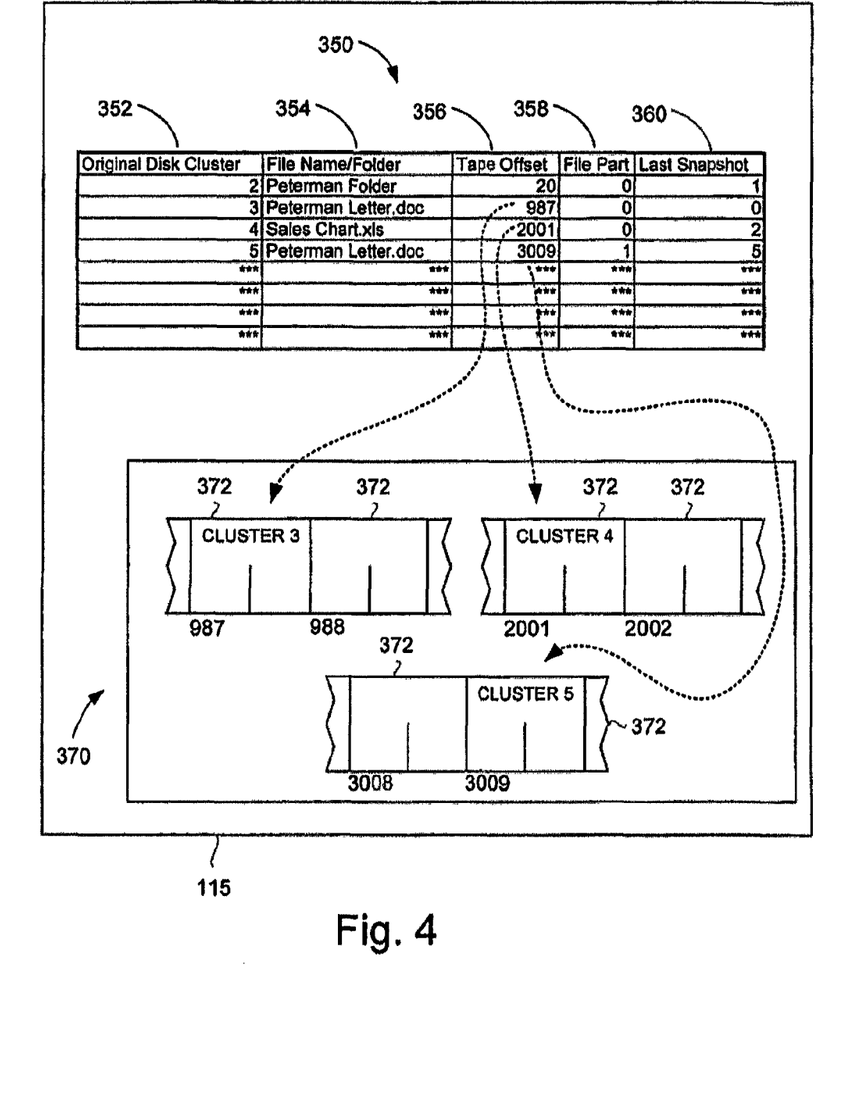
FIG. 4 is a block diagram illustrating the relationship between a map and a snapshot according to one embodiment of the present invention.

One embodiment of a snapshot used to track clusters read from the information store to clusters in a snapshot, as well as to map file and folder names corresponding to the snapshot clusters, is illustrated in FIG. 4. It should be noted that clusters are but one level of granularity that may be indexed by a snapshot, e.g., blocks, extents, etc. During the scan, the data agent creates a snapshot 350 and writes data, e.g., new or changed data, to a storage device 115. According to the present embodiment, the snapshot is illustrated as a flat file data structure, although those of skill in the art will recognize that the snapshot may be embodied in a number of disparate types of data structures.

The snapshot 350 is used to associate the original cluster numbers from an information store with clusters on a storage device, which in the present embodiment is a magnetic tape. It should be appreciated by those of skill in the art that the present invention is not limited to magnetic tape, and that the systems and methods described herein may be applicable to using snapshots with other storage technologies, e.g., storing disk geometry data to identify the location of a cluster on a storage device, such as a hard disk drive.

The tape offsets 356 for the clusters 372 in the snapshot 370 are mapped to original disk cluster information 352. File and folder names 354 may be scanned from the information store's FAT and also mapped to the tape offsets 356. A file part column 358 in the snapshot tracks the clusters 372 for each file and folder where each file and folder contains an entry for the first cluster 372. For files folders that are stored in more than one cluster, sometimes not in contiguous clusters, the offset table entry for each further cluster is numbered consecutively 358.

In order to identify the files and folders represented by the stored clusters 372, e.g., changed data, in the snapshot 370, the map may exclude data from columns relating to the original disc clusters 352 and last snapshot 360. In order to keep track of changed verses unchanged clusters, however, the original disk cluster information 352 is stored in the map 350. Other information may also be stored in the map 350, such as timestamps for last edit and creation dates of the files.

For each snapshot, even though only clusters that have been changed or created since a previous snapshot are tracked in a given snapshot after the initial snapshot to, the snapshot may be provided with the data from all previous snapshots to provide the latest snapshot with folder and file information such that an index of the entire information store is maintained concurrently each snapshot. Alternatively, this may be bypassed in favor of creating a snapshot that indexes all data at a given point in time in the information store and copying only changed data.

Entries from each snapshot 350 may also contain a last-snapshot field 360 that holds an identifier for the last snapshot containing the cluster indexed by the entry at the time the current snapshot was created. According to an alternative embodiment, e.g., for snapshots that do not store the information from the information store's FAT, the snapshot only tracks clusters stored in the information store with the clusters indexed by the snapshot. For those embodiments, the snapshot 350 contains neither file and folder information 345 nor file part information 358.

Returning to FIG. 3, once the first full snapshot to has been taken, step 300, the storage manager may implement a rule, policy, or similar set of instructions that require snapshots to be taken at certain time intervals. Accordingly, at each time interval where a subsequent snapshot tn is taken, the data agent works in conjunction with one or more of the media agents to perform and store snapshot and accompanying data that changed since the subsequent snapshot, $t_{n-1}$, loop 306.

For each snapshot, tn, that is taken of the information store, a comparison is performed such that only the clusters which have changed or been created since the last snapshot, tn.)' was taken of that volume, are stored, step 310. For example, in some embodiments the data agent employs a block filter or similar construct known to those of skill in the art to compare snapshot to with tn-i and thereby detect changed clusters on an information store. Alternatively, the data agent may use other techniques know in the art, such as Copy on Write ("COW"), to identify changed data on an information store. If a given cluster in the information store has changed since the last snapshot in which the cluster appears, or if the cluster from the information store was created subsequent to the last snapshot, then the cluster is read from information store and stored with the new snapshot being written to the storage device, step 3 14.

A determination is made regarding the given storage device to which the snapshot and changed data (which may also include newly created data) is to be written, step 316. Techniques such as those described in conjunction with storage of the initial snapshot, steps 302 and 304, may also be employed regarding storage of subsequent snapshots. Advantageously, the initial snapshot and any subsequent snapshot may written to any storage device available in the network. Furthermore, there is no limitation to the combination of devices used to store the snapshots for a given information store. For example, an initial snapshot may be written to storage device A, a second and third snapshots may be written to storage device B, and a fourth snapshot may be written to storage device C. Regardless of the storage device that is selected, step 316, the replication volume table is updated to reflect the location, step 318, allowing snapshots to be located when a user requests to restore the information store from which the snapshots were taken.

Figure 5:
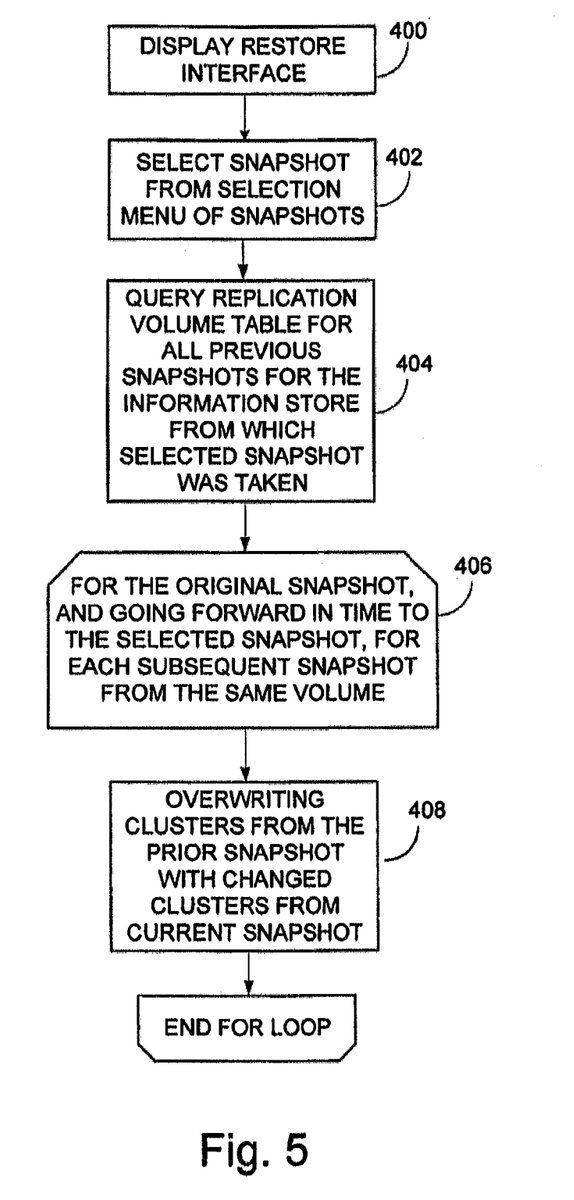
FIG. 5 is a flow diagram illustrating a method for restoring a snapshot according to one embodiment of the present invention.

System administrators use stored snapshots, in conjunction with the changed data that the snapshot indexes or tracks, to recover lost or corrupted information. FIG. 5 presents a flow diagram illustrating one embodiment of a method for restoring an information store from one or more snapshots. If the user or a system process wants to restore an information store from one or more snapshots, an interface is presented to restore the snapshot, step 400. The interface may be, for example, a graphical user interface ("GUI"), and Application Programming Interface ("API") or other interface known to those of skill in the art. The storage manager scans the replication volume table to identify available snapshots for presentation in a menu that allows selection of an available snapshot, step 402.

When the user selects a snapshot, the storage manager performs a query of the replication volume table to identify all previous snapshots for an information store from which the selected snapshot was taken, step 404. This may be accomplished by performing a search on the replication volume table for all snapshots with the same PrimaryVolumeId or PhysicalVolumeId. Starting with the selected snapshot, for each snapshot in the query result, loop 406, the storage manager directs a given media agent, in conjunction with a given data agent, to read and restore all clusters of changed data not already restored from clusters indexed by a prior snapshot, e.g., the latest version of each cluster, step 408. According to one embodiment, this is accomplished by restoring the clusters indexed by each of the snapshots in the query result, starting with the original snapshot, and overwriting clusters indexed by the original snapshot with changed clusters indexed by subsequent snapshots up to the snapshot representing the point in time selected by the user or system process. As an alternative, the last snapshot field of the selected snapshot may be utilized to determine the snapshots that should be utilized in the restore operation. The latest version of each cluster, starting with those indexed by the selected snapshot, is then restored, step 408.

Figure 6:
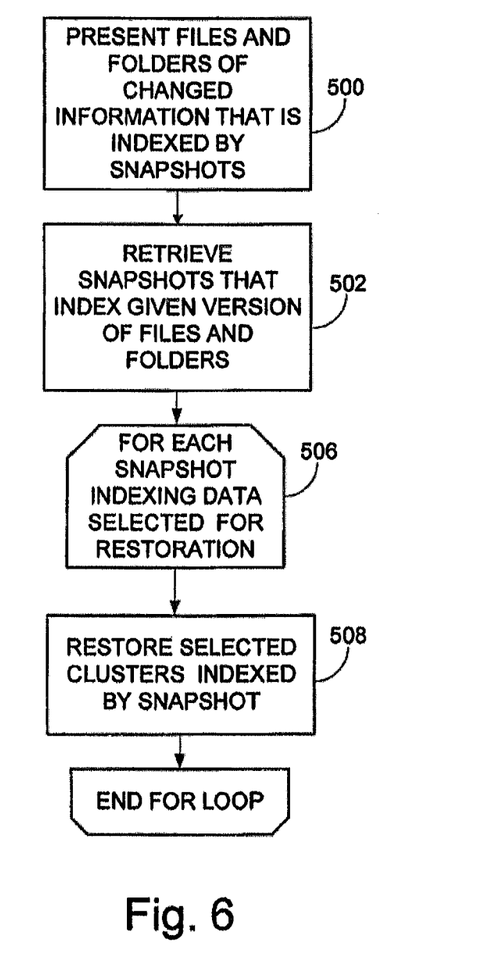
FIG. 6 is a flow diagram illustrating a method for restoring specific files or folders from a snapshot according to one embodiment of the present invention.

As discussed above, embodiments of the invention are contemplated wherein FAT information of the information store is stored in conjunction with a given snapshot, e.g. the file and folder information corresponding to the clusters of changed data indexed by a given snapshot. Accordingly, the storage manager may allow the user to select individual files and/or folders to be selected for restoration from a snapshot. With reference to FIG. 6, a flow diagram is presented illustrating one embodiment of a method for restoring individual files and/or folders indexed by a snapshot.

When the user desires to restore the information store to a given point in time, the user interface allows the user to view the files and folders indexed by a snapshot representing the point in time as if the user were viewing a folder structure on a storage device, step 500. The storage manager retrieves the file and folder information for changed data that is indexed by one or more snapshots for display. Once one or more files and/or folders are selected, step 502, the storage manager selects those snapshots that index the given version of the files and/or folders using the replication volume table, step 502. Each snapshot indexing data for the one or more files to be restored are opened serially, loop 506. The changed data for the selected files and folders that are indexed by the snapshots are restored from clusters indexed by each snapshot, step 508, but not overwriting clusters indexed by prior snapshots.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computing system that restores data to an information store, the method comprising:
   an information store;
   at least one storage manager in communication with the information store, the at least one storage manager comprising computer hardware; the storage manager directs performance of a first snapshot of the information store at a first point in time, the first snapshot comprising first data about at least one file existing at the first point in time;
   at least one media agent in communication with the at least one storage manager, the at least one media stores an index of the first data in at least one map, wherein the at least one map associates the first data with the first snapshot;
   the storage manager directs performance of a second snapshot of the information store at a second point in time occurring after the first point in time, and identifying changed data in the second snapshot that changed after the first point in time, wherein the changed data comprises portions of the at least one file that changed since the first point in time;
   the at least one media agent stores an index of the changed data in the at least one map, wherein the at least one map associates the changed data with the second snapshot; and
   the at least one media agent restores to the information store a copy of the at least one file existing at the second point in time using the map in association with the first and second snapshots to restore at least a portion of the at least one file existing at the first point in time and the changed data existing at the second point in time.

2. The system of claim 1 wherein the changed data comprises file information obtained from a file access table.

3. The system of claim 1 wherein the index of the changed data comprises of the changed data.

4. The system of claim 1 wherein the map identifies one or more previously saved snapshots where previous copies of the changed blocks were stored.

5. The system of claim 1 wherein the index of the changed data comprises one or more file names associated with the changed data.

6. The system of claim 1 wherein the at least one media agent stores copies of the changed data in association with a previous snapshot.

7. The system of claim 1 further comprising a block filter to identify the changed blocks.

8. The system of claim 1 further comprising copy on write to identify the changed blocks.

9. The system of claim 1, wherein restoring the copy of the at least one file existing at the second point in time comprises restoring the copy of the at least one file from the first snapshot and replacing portions of the restored at least one file with the changed data from the second snapshot.

10. The system of claim 1, wherein restoring the copy of the at least one file existing at the second point in time comprises restoring portions of the at least one file from the second snapshot and adding at least a portion of the at least one file existing at the first point in time.

11. A method in a computing system of restoring data to an information store, the method comprising:
    storing instructions in a non-transitory computer storage which perform the following acts when executed by one or more computing devices;
    performing a first snapshot of an information store at a first point in time, the first snapshot comprising first data about at least one file existing at the first point in time;
    storing an index of the first data in at least one map, wherein the at least one map associates the first data with the first snapshot;
    performing a second snapshot of the information store at a second point in time occurring after the first point in time, and identifying changed data in the second snapshot that changed after the first point in time, wherein the changed data comprises portions of the at least one file that changed since the first point in time;
    storing an index of the changed data in the at least one map, wherein the at least one map associates the changed data with the second snapshot; and
    restoring to the information store a copy of the at least one file existing at the second point in time using the map in association with the first and second snapshots to restore at least a portion of the at least one file existing at the first point in time and the changed data existing at the second point in time.

12. The method of claim 11 wherein the changed data comprises file information obtained from a file access table.

13. The method of claim 11 wherein the index of the changed data comprises the changed data.

14. The method of claim 11 wherein the map identifies one or more previously saved snapshots where previous copies of the changed blocks were stored.

15. The method of claim 11 wherein the index of the changed data comprises one or more file names associated with the changed data.

16. The method of claim 11 further comprising storing copies of the changed data in association with a previous snapshot.

17. The method of claim 11 wherein identifying the changed blocks uses a block filter to identify changes.

18. The method of claim 11 wherein identifying the changed blocks uses copy on write to identify changes.

19. The method of claim 11, wherein restoring the copy of the at least one file existing at the second point in time comprises restoring the copy of the at least one file from the first snapshot and replacing portions of the restored at least one file with the changed data from the second snapshot.

20. The method of claim 11, wherein restoring the copy of the at least one file existing at the second point in time comprises restoring portions of the at least one file from the second snapshot and adding at least a portion of the at least one file existing at the first point in time.

* * * * *